Figure 1:
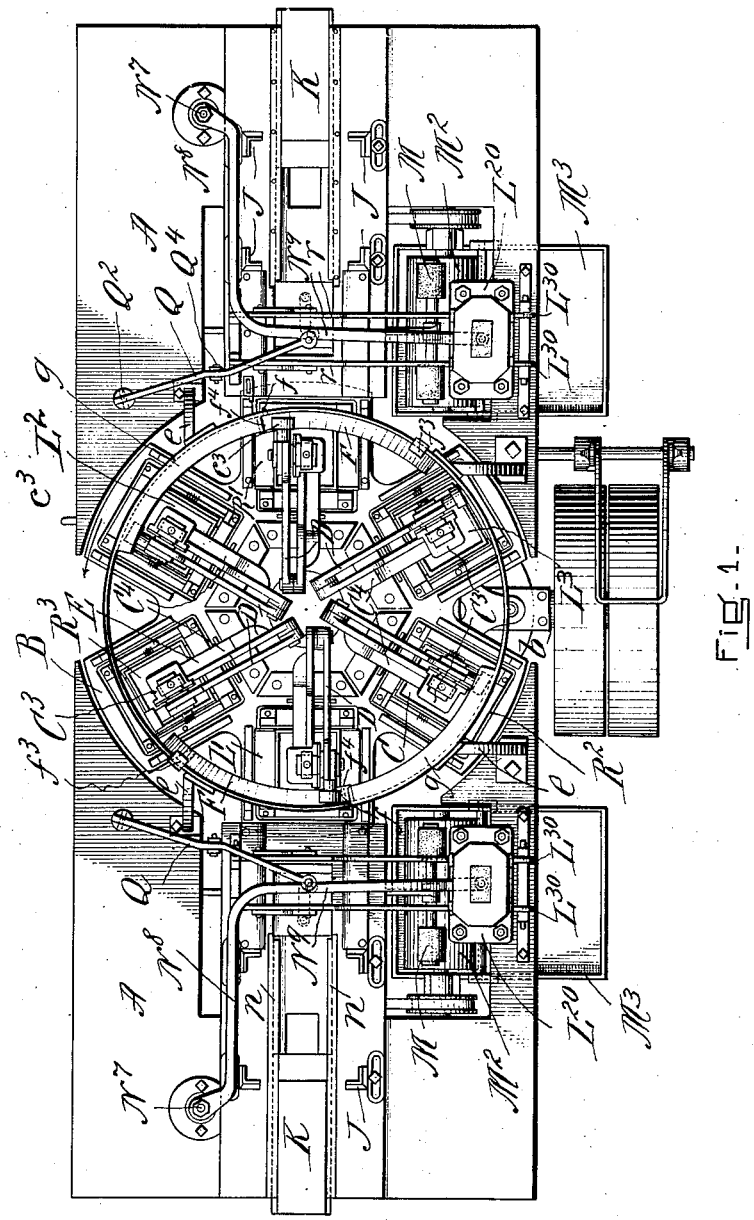

C. T. UPTON & G. S. GILMAN.
PAPER BOX MACHINE.
APPLICATION FILED JAN. 14, 1911.

1,037,372.

Patented Sept. 3, 1912.

12 SHEETS—SHEET 2.

C. T. UPTON & G. S. GILMAN.
PAPER BOX MACHINE.
APPLICATION FILED JAN. 14, 1911.

1,037,372.

Patented Sept. 3, 1912.
12 SHEETS—SHEET 3.

WITNESSES:
G. R. Driscoll.
H. L. Sprague

INVENTORS:
Charles T. Upton &
George S. Gilman,
by W. S. Bellows, Attorney.

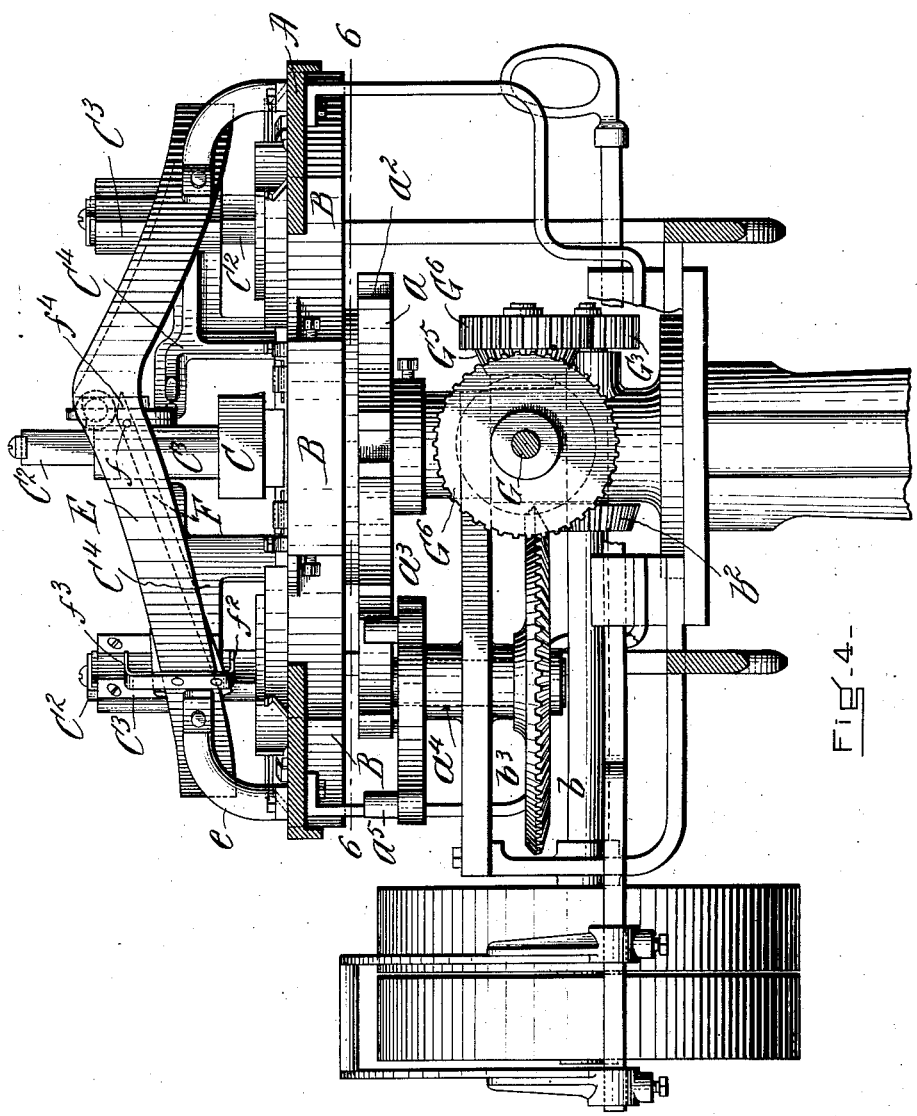

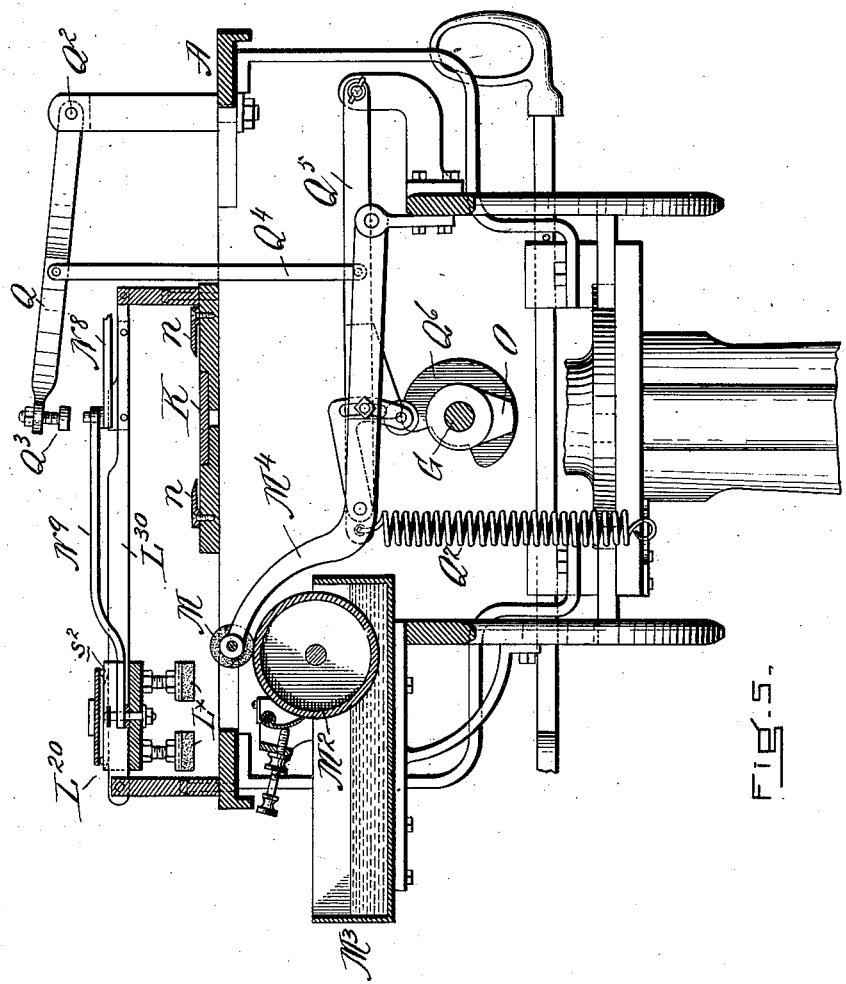

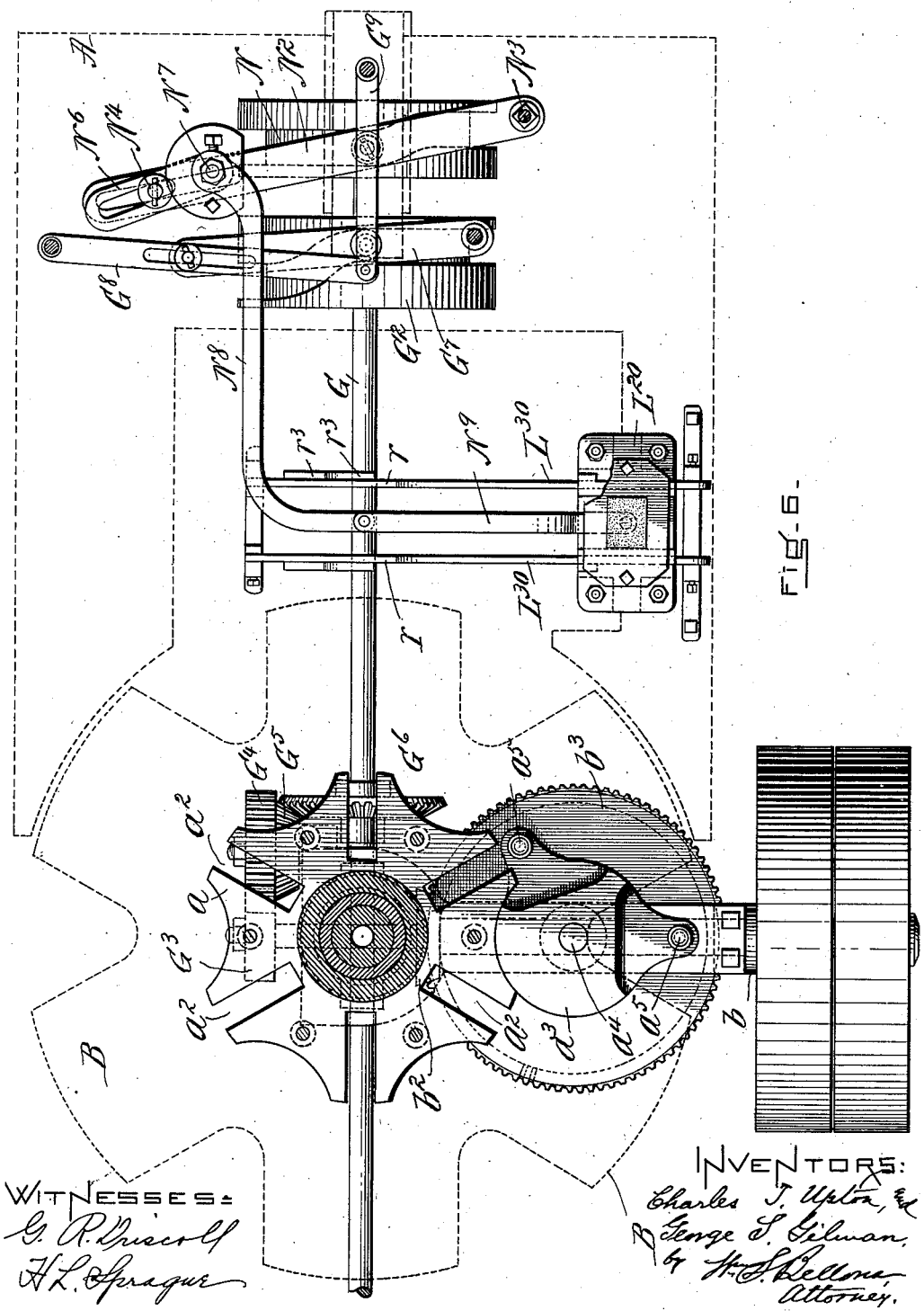

C. T. UPTON & G. S. GILMAN.
PAPER BOX MACHINE.
APPLICATION FILED JAN. 14, 1911.
1,037,372.
Patented Sept. 3, 1912.
12 SHEETS—SHEET 7.
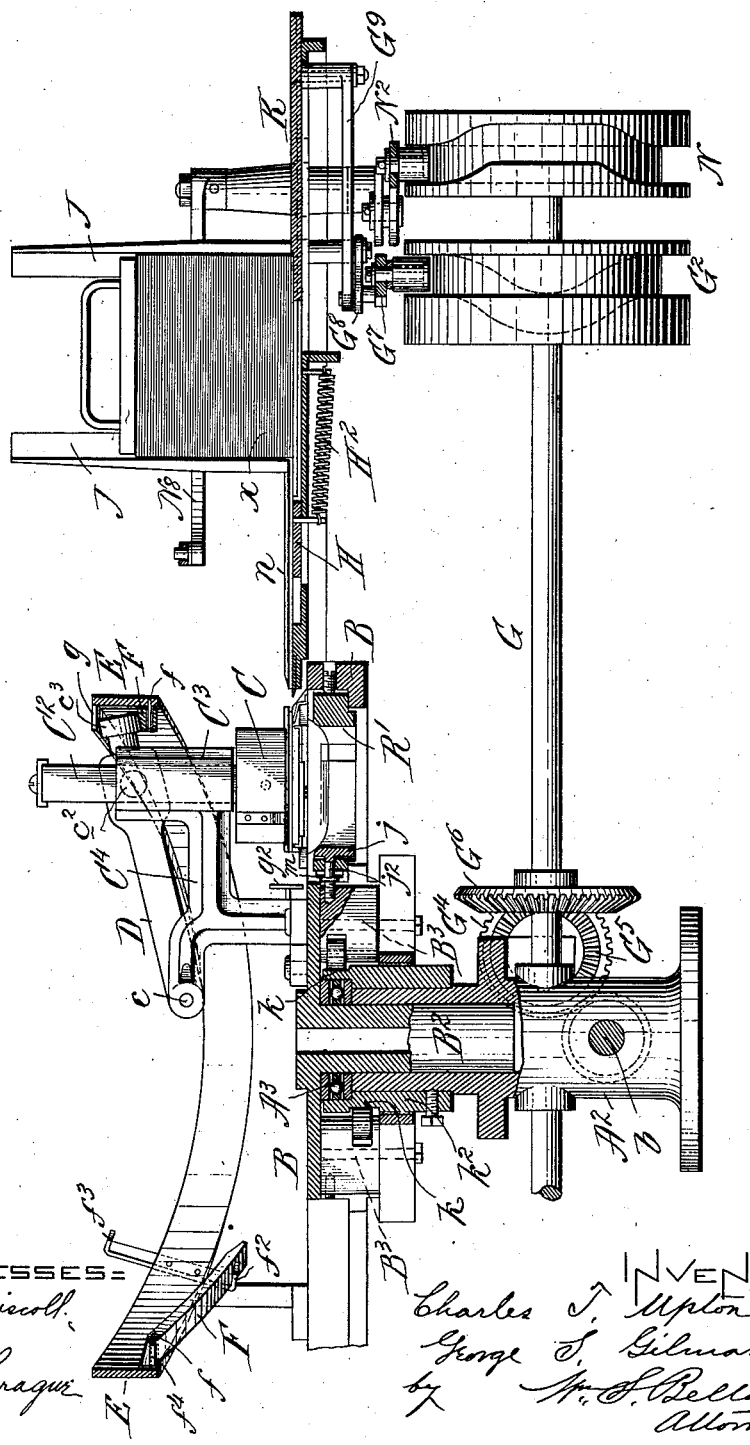

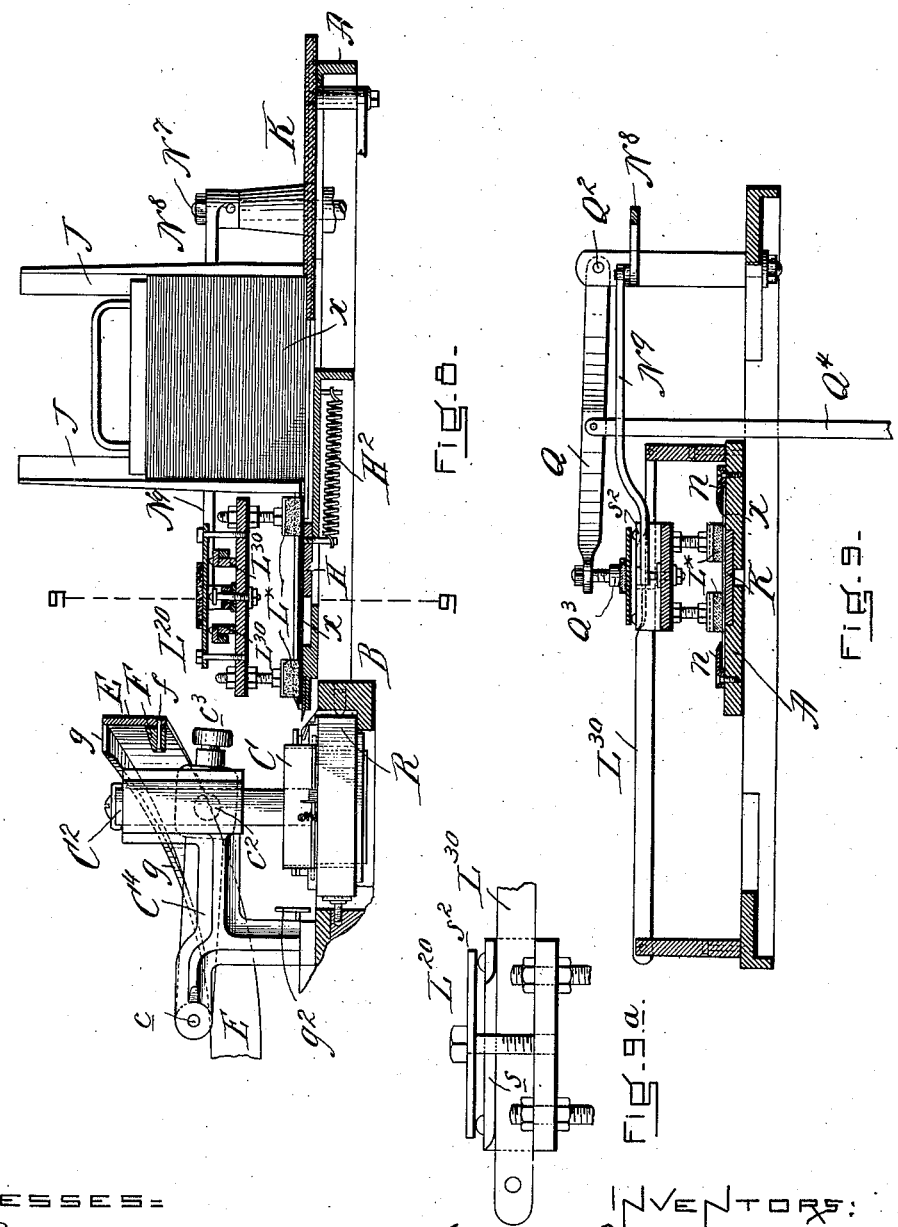

C. T. UPTON & G. S. GILMAN.
PAPER BOX MACHINE.
APPLICATION FILED JAN. 14, 1911.
1,037,372.
Patented Sept. 3, 1912.
12 SHEETS—SHEET 9.
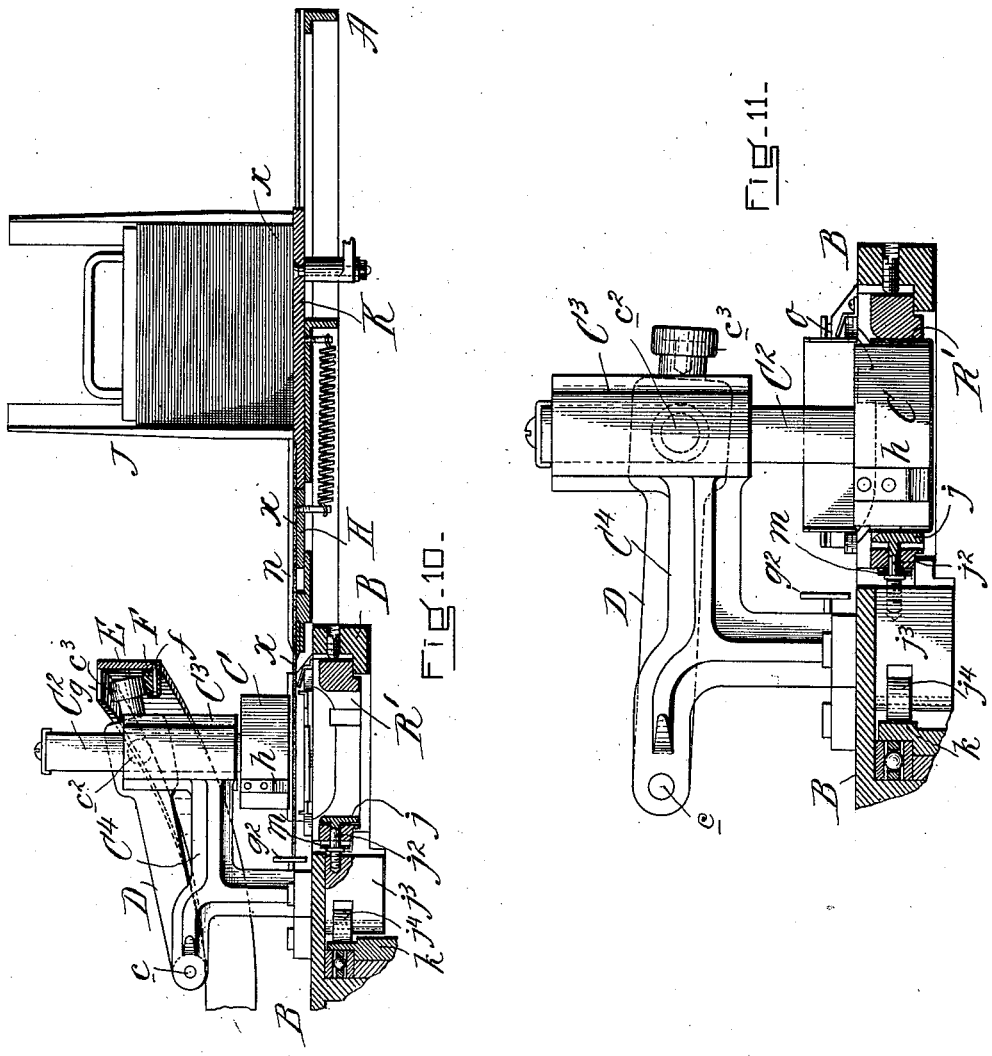

C. T. UPTON & G. S. GILMAN.
PAPER BOX MACHINE.
APPLICATION FILED JAN. 14, 1911.

1,037,372.

Patented Sept. 3, 1912.

12 SHEETS—SHEET 10.

WITNESSES:
G. R. Driscoll
H. L. Sprague

INVENTORS:
Charles T. Upton,
George S. Gilman,
by W. H. Bellom,
Attorney.

C. T. UPTON & G. S. GILMAN.
PAPER BOX MACHINE.
APPLICATION FILED JAN. 14, 1911.

1,037,372.

Patented Sept. 3, 1912.

12 SHEETS—SHEET 12.

WITNESSES:
G. R. Driscoll.
H. L. Sprague.

INVENTORS:
Charles T. Upton &
George S. Gilman
by W. J. Bellons,
Attorney.

UNITED STATES PATENT OFFICE.

CHARLES T. UPTON AND GEORGE S. GILMAN, OF LOWELL, MASSACHUSETTS, ASSIGNORS TO PERCY E. GINN, OF WINCHESTER, MASSACHUSETTS.

PAPER-BOX MACHINE.

1,037,372.

Specification of Letters Patent.     Patented Sept. 3, 1912.

Application filed January 14, 1911. Serial No. 602,557.

*To all whom it may concern:*

Be it known that we, CHARLES T. UPTON and GEORGE S. GILMAN, citizens of the United States of America, and residents of Lowell, in the county of Middlesex and State of Massachusetts, have invented certain new and useful Improvements in Paper-Box Machines, of which the following is a full, clear, and exact description.
This invention relates to improvements in machines for making boxes from paper or cardboard blanks provided in a pile or stack and successively fed, and gummed, one at a time, to the box forming mechanism.
The principal object of the invention is to provide a machine having multiple box forming mechanisms which are revolubly carried and sets of blank feeders and gummers at opposite sides of the machine, so that two gummed blanks are simultaneously brought to position relative to every opposite pair of the revoluble carrier box forming mechanisms to the end of acquiring great speed of action and a large box making capacity.

The present machine is one more particularly designed for the very rapid production of comparatively small paper boxes, although by reason of the susceptibility for the interchange of parts therein a considerable range for the making of variably sized and proportioned boxes in one machine is permitted.

A further object of the invention is to produce a machine which is extremely compact, unusually light, comparatively simple, and generally efficient in operation.

The invention is described in conjunction with the accompanying drawings and is defined in the claims.

Figure 2:
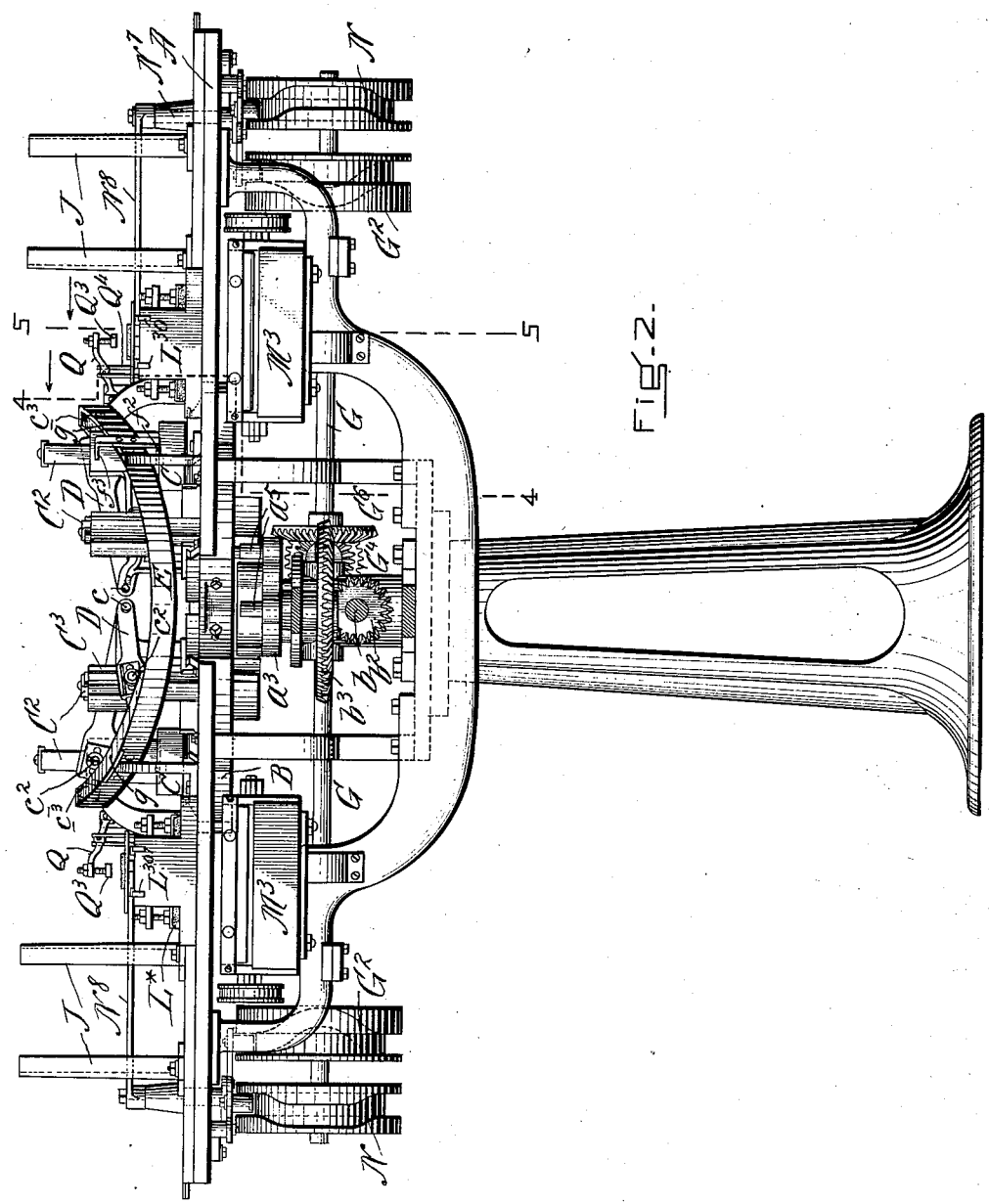
Figure 3:
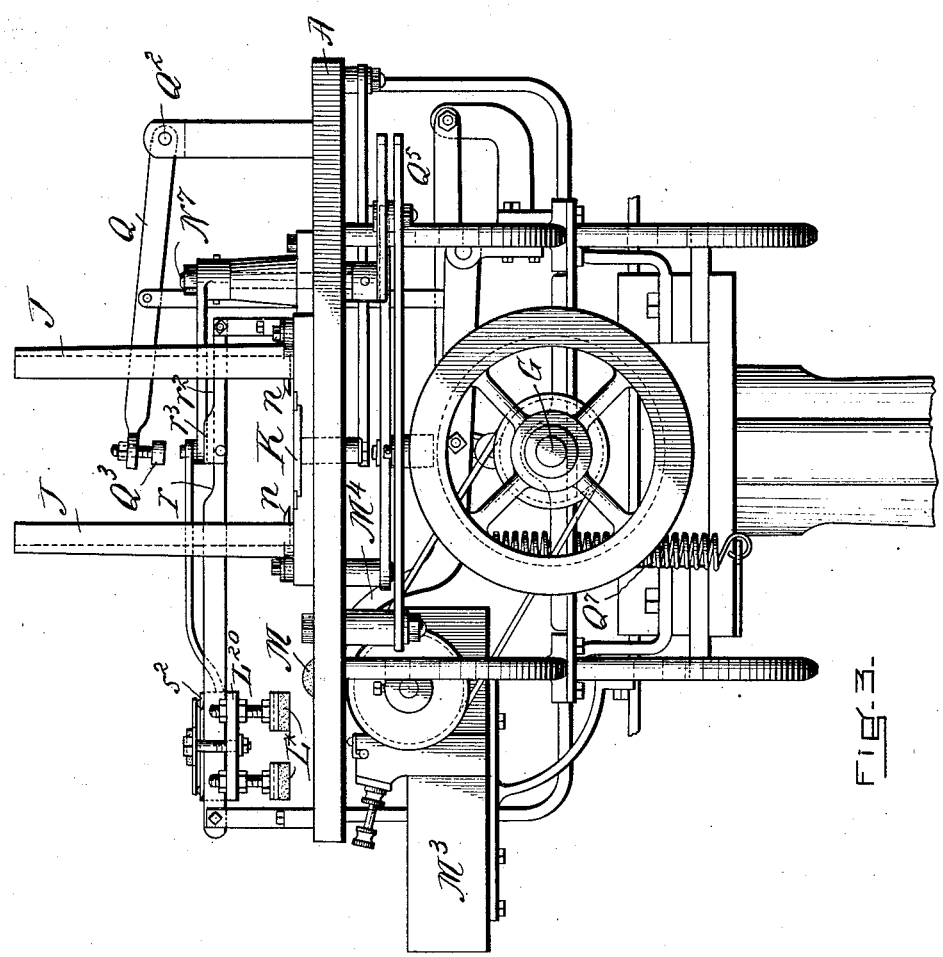
Figure 12:
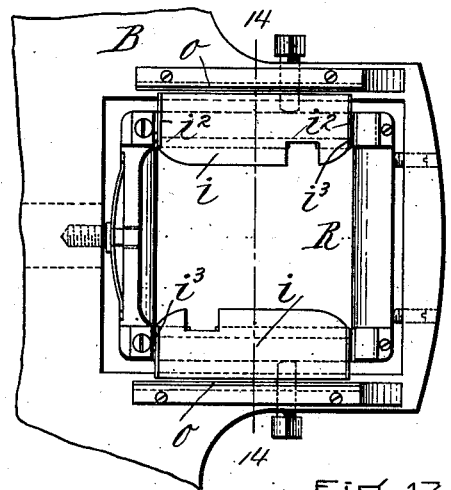
Figure 13:
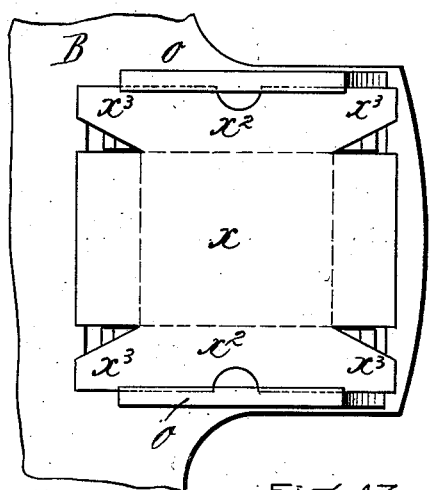
Figure 14:
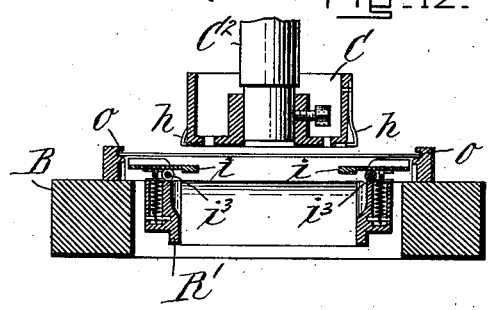
Figure 15:
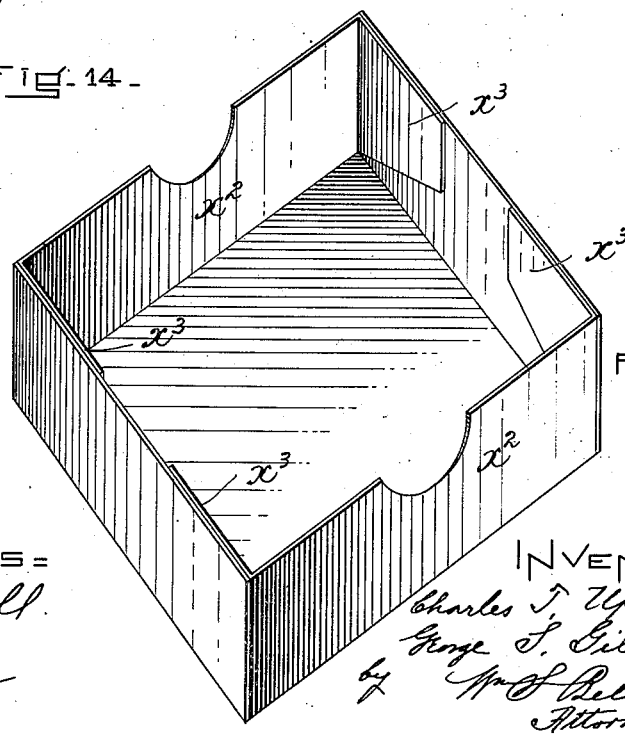
Figure 16:
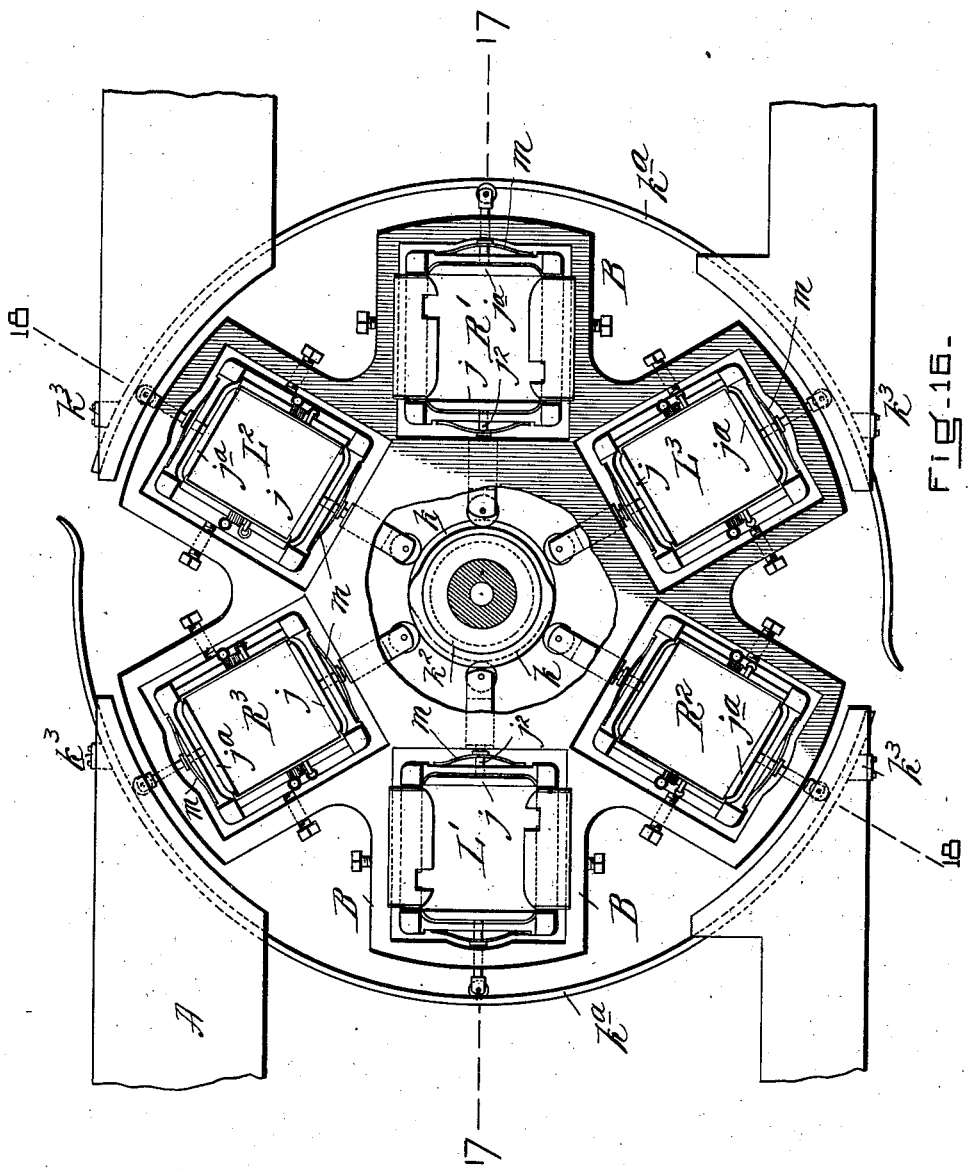
Figure 18:
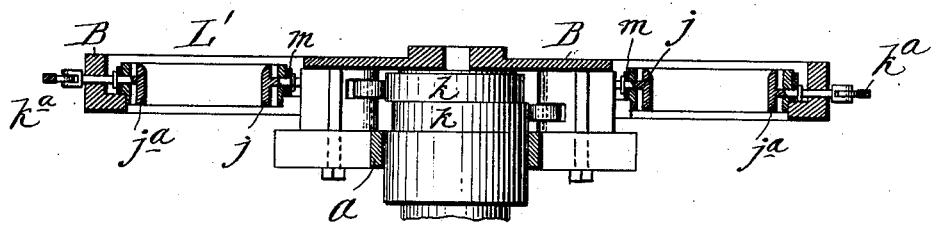
Figure 19:
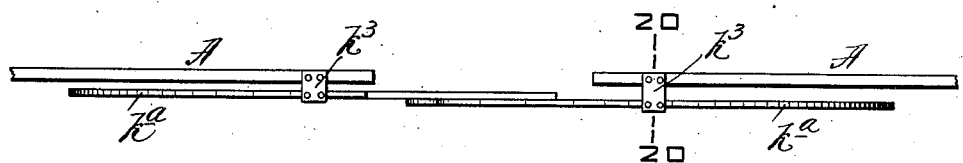
Figure 20:
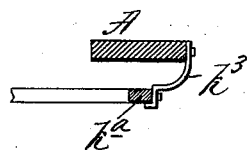

In the drawings:—Figure 1 is a plan view of the complete machine; Fig. 2 is a front elevation of the same; Fig. 3 is an elevation of the right hand end portion of the machine; Fig. 4 is a sectional elevation as seen beyond the section line 4—4, Fig. 2; Fig. 5 is a sectional elevation of the part immediately adjacent the section line 5—5, Fig. 2; Fig. 6 is a plan view of the parts beneath the revoluble box mold carrying frame on the machine substantially as seen on the line 6—6, Fig. 4; Fig. 7 is substantially a central vertical section longitudinally of the middle and right hand end portion of the machine, the box forming plunger being elevated; Fig. 8 is a view similar to Fig. 7, but showing the box forming plunger in its lowered position and the cam as in the act of applying gum on a blank designed to be delivered into one of the box forming mechanisms next to be brought relatively to the feeder; Fig. 9 is a vertical sectional view transversely of the machine as taken on the line 9—9, Fig. 8; Fig. 9ª is an end view of a portion of the gummer carriage to be hereinafter referred to; Fig. 10 is a vertical sectional view similar to Figs. 7 and 8, but showing the feed slide as in its inwardly operated position and a blank fed to position relatively to the box forming mechanism so as to be folded by the latter; Fig. 11 is a vertical sectional view showing a box folded in the box forming mechanism; Fig. 12 is a plan view of one of the molds in which a box blank is to be folded, the same showing in conjunction therewith an opposite pair of blank flap and stay section turners; Fig. 13 is a plan view showing a blank in position over one of the box molds; Fig. 14 is a sectional view through the elevated plunger and the box mold as taken on line 14—14, Fig. 12; Fig. 15 is a perspective view of such a box as may be made in this machine; Fig. 16 is a plan view to illustrate capabilities in the machine for acquiring direct and positive pressures against the inner and outer sides of the boxes being formed—Figs. 17 and 18 being vertical sectional views respectively on the lines 17—17 and 18—18, Fig. 16; Fig. 19 is a side view showing the manner of supporting the cams or bands which contribute in imparting pressures at the outer sides of the boxes, Fig. 20 being a cross section in detail on line 20—20, Fig. 19.

Similar characters of reference indicate corresponding parts in all of the views.

In the drawings,—A represents a table like structure having a comparatively large approximately circular aperture at its middle in which is located a horizontal revoluble frame B which is made with rectangular apertures in regularly spaced circular arrangement therearound and in which are fitted rectangular frames R', R², R³, and L' L² L³, which with their equipments are hereinafter termed "box molds." In accordance with the present invention, the number of the box molds in circular arrangement and regularly spaced in the revoluble frame B must be some even multiple of 3,—the number in the machine as constructed and here illustrated being 6.

While the box molds are, or may be all of the same character and construction, those particularly designated by R' R² R³ are the ones which receive paper box blanks $x$ at the right hand side of the machine, while those particularly designated L' L² L³ are the ones which receive blanks at the left hand side of the machine,—the blanks from which boxes are made by this machine, and the character of the box made from the blank being especially illustrated in Figs. 13 and 14, although the invention is not limited as to the capabilities for the making of boxes from blanks of other specific kinds.

The box mold frame B is supported so as to have its revoluble movement upon a standard A². The said standard A² is provided at its upper end with thrust bearings A³ upon which the box mold frame rests and revolves. The box mold frame is provided with a depending hub B² which has a fit for a free rotation and a steadying bearing in the standard A² which is of tubular construction.

The box mold frame B has as a fixed part or appliance thereof an index wheel $a$ which has radial recesses $a^2$, in the present instance 6 in number, corresponding to the number of box molds comprised in the revoluble frame. The index wheel which is a fixed suspended part of the box mold frame is secured to the latter by the series of rectangularly spaced bolts B³ indicated by dotted lines in Fig. 7, and cross sectionally shown in the horizontal sectional view, Fig. 6.

The box mold frame with its index wheel as a rigid part thereof and located therebelow, is independent of and freely rotatable relatively to the upright, and the collar $h^2$ provided with the peripheral cams $k$ $k$, which latter are to all intents and purposes as a fixed part of the standard.

The index wheel made with reëntrant arc formations or scallops at its edge forms one of the coacting members of what is sometimes termed a "Geneva lock," the other member thereof being comprised in the disk $a^3$ carried on a rotary shaft $a^4$, such disk having arms extending beyond its periphery and provided with studs $a^5$, the studs being drivers for the index wheel, while the peripheral portion of the disk, much less than the whole circumference thereof, in proper time locks into the scalloped edge of the index wheel, and all so that under the rotary motion of the stud-carrying disk the revoluble frame will be intermittently moved around so that the box molds at diametrically opposite portions thereof will be positioned always with precision in proper relation to the feeders at the right and left sides of the box mold frame. For an understanding of the particular action of this last referred to means for the propulsion of the revoluble box mold carrying frame, it will be seen on reference to Fig. 6 that the disk $a^3$ carries two of the driving studs $a^5$ arranged at "thirds," that is separated by a distance equal to two-sixths of their revoluble path or orbit so that after these two studs successively operate and continuously propel the index wheel and box mold carrying frame around two sixths of a revolution, or the distance between the centers of alternated pairs of such box molds, there will be a comparatively long dwell whereby the box molds will remain stationary in their positions toward the opposite ends of the machine in relation to, and for receiving blanks from, the feeders; and this propulsion mechanism, furthermore, assures that the box molds which have their dwells in relation to the feeding mechanism toward the left hand end of the machine will in coming around to the opposite, right hand part of the machine, pass the feeding mechanism thereat, while the other box molds R', R² and R³ which have their stoppages in relation to the feeding mechanisms toward the right hand end of the machine pass, without stopping, opposite the left hand feeding mechanism.

The vertical shaft $a^4$ which carries the driver for the index wheel is rotated at a regular speed by means as follows:—$b$, Fig. 6, being the horizontal transversely mounted main shaft of the machine carries at an intermediate part thereof a bevel gear wheel $b^2$ which meshes into a bevel gear wheel $b^3$ which rotates in a horizontal plane and is fast on the aforementioned vertical shaft $a^4$.

The index wheel and the manner of driving it while an important provision from a mechanical standpoint is not assumed as comprising any patentable novelty.

It is to be understood of this machine, at the outset, that 3 of the alternate box molds of the series of the 6 shown coact with the right hand blank feeder, while the three relatively intermediate box molds register with the left hand feeder, each box mold forming part of a box forming mechanism of which the vertical reciprocating plunger C is a coöperative member. Each plunger block individual to the box mold is carried at the lower end of a vertical stem or bar C² which plays in a vertical guide C³ therefor, the six guides being respectively supported on as many brackets C⁴, the same having radial arrangements on the revoluble mold frame, as represented in Fig. 1.

The means for imparting the reciprocatory movements to the revolubly carried plungers will be now described:

For each plunger bar C, a lever D is provided, the same having the inner end thereof, by pivot $c$, jointed to an inner portion of the bracket which is appurtenant to such plunger, a portion of this lever near its outer end having by stud $c^2$ a connection with the plunger bar which at this point may be more or less loose for the avoidance of cramping in the up and down swinging motion of the lever. The extremity of the lever which extends for a short distance outwardly beyond the vertical line of the plunger bar is preferably equipped with a roller $c^3$ for easy coaction with the cams which have forcing movements thereagainst, and which cams, their relative positions, and their manner of being mounted, will be now described.

E represents a ring shaped frame which is supported above and concentrically relatively to the box mold frame upon the upstanding brackets $e$ $e$, the foot pieces of which are attached to the table A near the middle opening therein.

F F represent cam bars, indicated in Figs. 1, 2, 3, 7 and 8, one having a location over a mold box positioned at the right hand side of the machine, while the other has its location over a mold box positioned at the left hand side of the machine. Each cam bar F is by its pivot $f$ tiltably mounted, and the pivot of the right hand cam bar F is but a short distance from the rear end of such cam bar; and the cam bar from its pivotal point inclines with a proper grade downwardly and forwardly; and the other cam bar F at the left hand side of the machine is reversely arranged to the one last mentioned, that is it is pivoted near its forward end and has a slant from its pivotal point downwardly and rearwardly.

$f^2$ represents a stop for supporting each cam bar, and $f^3$ represents a stop for preventing the cam bar from being unduly thrown upwardly.

It will be perceived that each cam bar is a lever, the greater portion of the length of which constitutes the long arm thereof while the short portion thereof beyond the pivot constitutes the short arm thereof, the latter being represented by $f^4$ in Figs. 1, 4 and 7.

Beyond each cam bar F relatively to the circular line of travel of the roller-provided extremities of the revoluble levers are fixed cam members $g$, $g$, the same being constituted by flanges of the aforementioned supporting ring E which, as clearly represented in the drawings, is a ring having dips therein so that while as to its periphery it is truly cylindrical, its edges are undulatory,—this, however, being a matter of design to render such supporting ring more fit to its purpose and so that the aforementioned flanges forming cams $g$ will in a simply produced manner have their proper downward inclinations or grades from the high ends of the tiltable cams. The end portions of the flange cams are above and slightly overlap the short arms $f^4$ of the cam bars F.

When a box mold R has been brought and temporarily locked by the aforedescribed driving mechanism in its right hand position so that a blank may be received thereover, the plunger will have been elevated to its highest extent by reason of the roll-provided extremity of the plunger operating lever riding up on the adjacent up grade cam F,—the plunger thus affording no impediment to the free sliding of the box blank horizontally thereunder up to a proper limiting stop or gage $g^2$ therefor, Figs. 7, 8, 10, and 11; and at the same time conditions are exactly the same at the left hand side of the machine. The plunger appurtenant to the diametrically opposite box mold L' being elevated by reason of its having ridden up on the left hand up grade tiltable cam so that here likewise the box blank may be fed over the left hand mold, the revoluble box mold frame after having had a dwell so that an opposite two of the box molds were in the positions which have just been described, such frame will, after the short interval, and by reason of the nature of its driving mechanism, be given its revolubly progressive movement so that the box mold R' will pass around to the rear and the box mold L' will come around forwardly. The impingement by the down grade flange-like cam $g$ on the plunger operating levers for the box molds R' and L' will force the plungers down into the box molds and effect the folding and making into a box of the box blanks which have been supplied to such box molds; and each plunger will remain in its down position until it shall have come around again almost to the place where it originally received its blank from the feeder, whereupon such plunger will be again elevated by the up grade cam. After the box molds R' and L' have received blanks and moved away from proximity to the oppositely located feeders, the box molds R² and L² will then be brought and for an instant left to remain in their proximities to the opposite blank feeders, and so also the box molds R³ and L³ will be brought to such locations, such intermittent positioning of the box molds being repeated in the order stated, time and time again under the power driving of the machine.

Now, with reference to Fig. 1, it will be perceived that when the box mold R' moves around to the rear to have its plunger lowered therein for the making of a box, it will be followed by the box mold L³ the plunger of which is down into the box made in such mold; and inasmuch as it is highly desirable that the plunger in the mold $L^3$ shall remain in its down position throughout almost its entire cycle, there will be an avoidance of raising the plunger for this particular mold when it arrives at the location of the right hand up grade cam, because just as the plunger operating lever appurtenant to the box mold $R'$ is about to pass by the pivot point $f$ of the right hand cam F, it will depress the short arm $f^4$ of such lever-like cam and tilt its long member upwardly so that the roller provided extremity of the next following plunger-operating lever will pass below and will be unaffected by this particular cam bar; but, of course, the second mold box following the one $R'$,—the one $R^2$,—will have its plunger elevated in the same manner as was that appurtenant to the box mold $R'$. Then the plunger appurtenant to the box mold $L'$ will be permitted to pass under the right hand cam bar, and be unaffected by the presence of the latter, and then the plunger for the box mold $R^3$ will be elevated by the right hand cam bar. And, of course, as manifest, the same manner of operations transpires at the left hand side of the machine, each of the plunger operating levers for the box molds $L'$, $L^2$ and $L^3$ being effective in displacing the cam bar which operated them, so that the operating levers for the other set of plungers will pass under and be unaffected by such left hand cam bar.

In this machine the boxes are self shedding, that is, a box already made, for instance in mold $R'$, after having made a little more than a complete cycle, will, by the next box made in the same box mold, be expelled downwardly through the bottom of such mold; and as a provision to insure certainty of expulsion of a box made in each forming frame or mold, each plunger made as represented in Fig. 14, is provided with flat spring appliances $h$ represented in Figs. 7, 10, 11 and 14, the same being set in shallow depressions therefor in the opposite vertical faces of the plunger and having outwardly deflected and return bent lower extremities,—these appliances positively engaging across the upper edges of the walls of the made boxes and forcing them downwardly and out of the box molds. These, however, in many instances may be advantageously omitted.

As particularly represented in Figs. 12 and 14, each box mold has at opposite sides thereof turners $i$ $i$ for the opposite side flaps of the box, with opposite end right angular flanges $i^2$ which are operative for turning in the stay sections $x^3$ of the box, these devices being mounted on the pivots $i^3$ and are appliances of known and approved character susceptible of advantageous use in machines of this kind.

Figure 17:
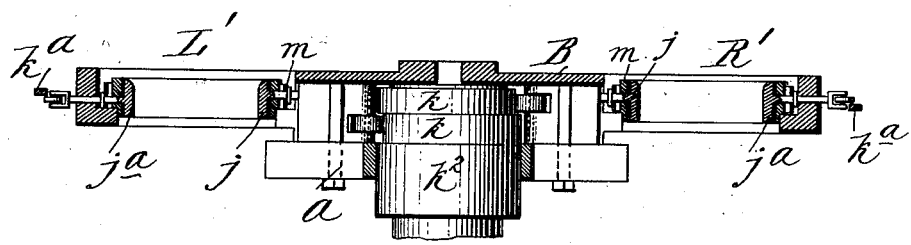

Each rectangular frame which constitutes the box mold and which is interchangeably mounted in the rectangular opening therefor in the revoluble table-like frame, is provided at its side toward the center of the table with a movable bar or false wall $j$ which is provided with a stem $j^2$ which plays freely through an opening in the box mold frame and has as an extension or connecting member thereof a part $j^3$ which is provided with a friction roller $j^4$ which has a bearing revoluble around on a fixed peripheral cam member $k$. The stem $j^2$ is shouldered at a portion thereof beyond the exterior of the mold frame, and such shouldered part constitutes an abutment or resistance member for a flat spring $m$ which is operative to retract the movable wall so as to normally widen the box blank receiving space therein. There are two of the peripheral cam surfaces $k$ $k$ on the stationary part $k^2$ appurtenant to the central standard, one having its location higher than the other, and the prominent portions of these cams are diametrically opposite each other, the stems or extensions of the movable walls $j$ of the sets $R'$, $R^2$ and $R^3$ being at a suitable height for coaction with one of these cams, while corresponding stems appurtenant to the other set of box molds $L'$, $L^2$ and $L^3$ being at a slightly different level for coaction only with the other peripheral cam $k$. Thus every time a box mold in its revoluble progression comes to that position in the machine at which the plunger is downwardly moved into it to bend the flaps and stay sections into box form, a positive crowding pressure will be imparted by the movable wall against that side of the box at which one pair of the stay sections are located; and this crowding action may be effective to impart a slight transverse movement to the plunger so that the latter will crowd and press the opposite side of the box against the adjacent inner wall of the box mold. These provisions will be ample and efficient in many cases, but in some cases where certain kinds of stock may be used and it is desirable to effect pressures at opposite sides of the box in a more positive way, each mold frame, as represented in Figs. 16 to 18 may have a second movable wall $j^a$, with a stem or extension and cam roller, substantially the same as described as appurtenant to the inner side movable wall. These appliances receive coaction with cam and pressure bands $k^a$ having a surrounding and concentric arrangement relatively to the revoluble mold frame and supported from the main table A by the brackets $k^3$.

The means, required for making this machine an operative entirety, for feeding the paper box blanks in gummed condition at opposite sides of the machine for the different sets of box making mechanisms will be now described,—the description for one of these duplicated mechanisms to be considered as sufficient.

J J represent vertical blank stack guides having their locations near the opposite ends of the table A beneath which plays a feed slide K having the end portion thereof which is always under the stack of blanks $x$ of step shape. Reciprocatory movement at proper times is imparted to the feed plate; and the length of motion of the feed plate is such as to push the bottom blank of the stack from the position shown in Fig. 7 forwardly to the position shown in Fig. 8, at which it will be gummed at the proper places on the stay sections thereof. The table at opposite sides of the line of travel of the blank toward the revoluble mold frame is provided with guides $n$ having inwardly overhanging tops, these being clearly shown in cross section in Figs. 5 and 9.

When a blank is pushed forward to the position to be gummed it will not have reached its final position over the box mold; and the feed slide rearwardly retreating or on next coming forward will push the next blank to the intermediate position to be gummed, and such blank will be effective for pushing the already gummed blank to position over the box mold, all as clearly seen on reference to Fig. 10; and also, as will be seen on reference to Figs. 12 to 14, the edges of the blank coming over the blank mold are guided in proper position by the opposite blank guides $o$ $o$.

The means for imparting the reciprocatory movement to the feed slide is as follows:—On the rear end of the driving shaft is a spur gear wheel $G^3$ which meshes into a spur gear wheel $G^4$ mounted on a stud and which gear wheel $G^4$ is made unitary with a bevel gear wheel $G^5$ which is in mesh with a bevel gear wheel $G^6$ on the aforementioned cam provided shaft G. $G^7$ represents a lever provided with a roller or stud operated by the path cam $G^2$, and this lever, as shown in Fig. 6, has a stud-and-slot connection with a lever $G^8$ which is pivoted at one end on the underside of the table and which by the link $G^9$ is connected with the feed slide.

As shown in Figs. 7, 8 and 10, the table inwardly beyond the pile stack is made recessed and has a supplemental slide H therein which is held in the rearward position shown in Fig. 7 by the spring $H^2$; and this is bodily pushed forwardly every time the feed slide K is advanced so as to assume the position shown in Fig. 10, the same being retracted by its spring upon every retreating movement of the feed slide.

L* represents the gummers, the same being formed as pendant members of a carriage $L^{20}$ which has a straddle relation about and rides upon a pair of runner bars $L^{30}$ which are arranged horizontally and transversely of the table, as fully shown in Figs. 1, 3, 5, 8 and 9 of the drawings. This carriage has not only a rearwardly and return forwardly sliding movement on the runner bars so as to carry its gummers L* over and very slightly above the surface of the blank brought to the gumming position, but it also has a descending movement so that the gummers may descend to contact on the blank whereupon by means hereinafter pointed out the gummer carriage or frame receives a thrust in a downward direction so that the blank will be effectually gummed.

The normal position of the gummers is shown in Figs. 1, 3, 5 and 6 of the drawings, while its gumming position is that shown in Fig. 9. The gummer while in its normal position is directly over a gum distributing roller M which coacts with a gum supply roll $M^2$ in the gum box $M^3$.

The gummer carriage $L^{20}$ is operated primarily from the path cam N on the aforementioned shaft G. With this cam coacts a horizontally swinging cam lever $N^2$ which by pivot $N^3$ at one end is connected at the underside of the table A, while the outer end of this lever has a stud and slot engagement with the crank like lever $N^6$ which is fixed on a vertically mounted oscillatory shaft $N^7$ which carries a long angularly horizontal lever $N^8$ which by link $N^9$ is connected with the carriage.

Just as the carriage is in readiness to be rearwardly moved to gumming position, the distributing roller M is very slightly elevated from its position shown in Fig. 5 up to the level of the lower surfaces of the gummers L* L* so that in the rearward traverse of the gummers to move across and receive gum from the distributing roller M, the roller is temporarily raised by the cam Q on the shaft G which impinges against the roll carrying lever $M^4$ for a sufficient period. After every elevation of the distributing roller it gravitatively descends to its position of bearing on the gum supply roller $M^2$ which is constantly rotated in the gum box in a common manner.

The runner bars $L^{30}$, as shown, have depressions $r$, $r^2$ in their rearward portions with an intermediate portion $r^3$ having the full height of the upper edge of the runners, and such portion $r^3$ of each runner bar is made as an outside lug on the runner. The carriage $L^{20}$ has at its upper portion at each of its opposite ends a horizontal ledge like member $s$ shown in Fig. 9a, which rides on and along the top horizontal edge of the runner bar; and it also has a further outwardly extending part $s^2$.

When the carriage is drawn rearwardly through the cam actuated lever and link motion heretofore described therefor, it will move horizontally until its portions $s$ and $s^2$ reach the depressed portions $r$ and $r^2$ of the runner bars, whereupon it will drop in the slight extent and allowed to stand, as it were, with its feet on the blank. The coaction of the parts $s^2$ and $r^3$ are effective for preventing a tilting of the gummer carriage so that it cannot in any manner scrape along on the surface of the blank before coming to its proper final position in relation thereto; but on the other hand it is caused to come squarely over the blank and then falls in a vertical line.

Immediately the gummer, supplied with adhesive, descends to stand on the blank, as shown in Fig. 9, the mechanism for imparting the downward thrust thereto is actuated; and such mechanism consists in a lever Q pivoted at $Q^2$ and provided with a hammer like member $Q^3$ at its free extremity over the position to which the gummer carriage is rearwardly brought. This lever is by link $Q^4$ connected with a lever $Q^5$ with the inclined lower portion of which the cam $Q^6$ coacts so that at the proper times the thrust member for the gummer will be given its forcible downward movement as rendered the more positive by the spring $Q^7$.

As will be evident from an understanding of the nature and capabilities of this machine, alternately arranged box forming mechanisms may be equipped for the making of boxes of one size while the relatively intermediate set of box forming mechanisms may have equipments for the making of boxes of a different size so that at the right hand different boxes may be made from those being produced at the left; and if desired, the machine may be run so that, for instance, only the mechanisms comprising the box molds R', $R^2$ and $R^3$ may be employed, while those comprising the box molds L', $L^2$ and $L^3$ may be left idle, or vice versa.

We claim:—

1. In a paper box machine, in combination, a revoluble frame comprising regularly spaced box molds in circular arrangement, the number of which is an even number and multiple of three, plungers individual to the box molds reciprocatingly mounted on the revoluble frame, means at opposite ends of the machine for feeding blanks simultaneously over oppositely located box molds, means for intermittently revolubly moving the frame in extents equal to the distance between alternated pairs of the box molds, and means for intermittently reciprocating the plungers.

2. In a paper box machine, in combination, a revoluble frame comprising a series of regularly spaced box molds therearound and plungers respectively appurtenant to the box molds reciprocatingly mounted on the revoluble frame, levers pivotally mounted on the revoluble frame and operatively connected with the plungers, cams mounted on a support at opposite sides of the machine above and independent of the revoluble frame with which certain of the revolubly carried plunger operating levers are successively brought to coaction, and blank feeders located at opposite sides of the machine operative to simultaneously supply box blanks successively onto opposite pairs of the molds which are brought to proximate relations thereto.

3. In a paper box machine, in combination, a revoluble frame carrying a box mold and also carrying a blank folding plunger for coaction with the mold, together with a lever pivotally mounted on the revoluble frame and operatively connected with the plunger and having portions thereof extending outwardly beyond the latter, a cam bar having an upward inclination supported above and independently of the revoluble frame, and another cam member having a downward inclination and farther along in the path of revolution of the extremity of the lever, and both cams relatively positioned to receive coaction therewith of the extremity of the lever for first elevating and then downwardly moving the plunger.

4. In a paper box machine, in combination, a revoluble frame comprising a series of regularly spaced box molds therearound, plungers respectively appurtenant to the box molds and reciprocatingly mounted on the revoluble frame, blank feeders oppositely located at the right and left hand sides of the revoluble frame, means for intermittently moving the frame so that every opposite pair of the box molds thereof will be successively positioned relatively to the opposite blank feeders, means for causing the plungers appurtenant to the temporarily located right and left hand box molds to be elevated upon coming in proximity respectively to the right and left hand feeders, which means is non-effective for elevating the plungers appurtenant to the box molds of the series next to the rear of, and revolubly following the first given oppositely located pair of the molds.

5. In a paper box machine, in combination, a revoluble frame carrying a series of box molds in regularly spaced arrangement therearound, and also carrying blank folding plungers respectively appurtenant to the several molds, together with a series of levers pivotally mounted on the revoluble frame operatively connected respectively with the plungers and having portions thereof extending outwardly beyond the plungers, cam bars at opposite sides of the machine, each having upward inclinations, and movably mounted above and independently of the revoluble frame, and positioned to receive coaction therewith of the extremities of the levers, and means for displacing each of said cam bars from its normal effective position, on the arrival in proximity thereto of every second one of the said series of levers.

6. In a paper box machine, in combination, a revoluble frame carrying a series of box molds in regularly spaced arrangement therearound, and also carrying blank folding plungers respectively appurtenant to the several molds, together with a series of levers pivotally mounted on the revoluble frame operatively connected respectively with the plungers and having portions thereof extending outwardly beyond the plungers, and cam bars at opposite sides of the machine, each having an upward inclination and pivotally supported near an end thereof above and independently of the revoluble frame, the extremities of alternating ones of the plunger operating-levers, after riding up on the cam bars beyond the pivoted points thereof, being effective for tilting the cam bars so that the extremities of the relatively intermediate levers will have their course of movement beneath, and unaffected by the cam bars.

7. In a paper box machine, in combination, a revoluble frame carrying a series of box molds in regularly spaced arrangement therearound, and also carrying blank folding plungers respectively appurtenant to the several molds, together with a series of levers pivotally mounted on the revoluble frame operatively connected respectively with the plungers and having portions thereof extending outwardly beyond the plungers, and cam-bars at opposite sides of the machine each having an upward inclination and pivotally supported near an end thereof above and independently of the revoluble frame, the extremities of alternating ones of the plunger-operating-levers, after riding up on the cam bars beyond the pivotal parts thereof, being effected for tilting the cam bars so that the extremities of the relatively intermediate levers will have their course of movement below and unaffected by the cam bars, and cam members in a circular path beyond the said pivoted cam bars, having downward inclinations.

8. In a paper box machine, in combination, a revoluble frame comprising a plurality of regularly spaced box molds each having a movable wall, plungers reciprocatingly mounted on the revoluble frame and respectively coacting with the box molds, means at opposite sides of the machine for feeding blanks simultaneously over oppositely located box molds, means for intermittently moving the revoluble frame, means for reciprocating the plungers, and means for forcing the movable wall of each box mold inwardly toward the side of the plunger during the presence of a plunger therein.

9. In a paper box machine, in combination, a revoluble frame comprising a plurality of regularly spaced box molds, each having opposite movable walls therein, plungers individual to the box molds and reciprocatingly mounted on the revoluble frame, means at opposite ends of the machine for feeding blanks simultaneously over oppositely located box molds, means for intermittently moving the revoluble frame, means operative for reciprocating the plungers, and means for approachingly forcing the opposite movable walls of each box mold during the presence of a plunger within the latter.

10. In a paper box machine, in combination, a standard having a peripheral cam thereon, and a frame revolubly mounted on said standard comprising a series of regularly spaced box molds therearound, an inner wall of each being movable and provided with a stem projecting inwardly toward the standard, and members slidably supported with which each said stem is connected and which coacts with the cam on the standard, plungers mounted on, and bodily revolubly movable with, the frame, and also reciprocatory relatively to the respective box molds, means for intermittently revolubly moving the box mold frame, and means for reciprocatingly operating the plungers.

11. In a paper box machine, in combination, a standard having peripheral cams at different heights thereon, and a frame revolubly mounted on said standard comprising a series of regularly spaced box molds therearound, an inner wall of each being movable and provided with a member projecting inwardly toward the standard, every other one of which members coacts with one of the cams on the standard, while the relatively intermediate ones of said members coact with the other one of the cams on the standard, plungers mounted on and bodily revolubly movable with the frame, and also reciprocatory relatively to the respective box molds, means for intermittently revolubly moving the box mold frame, and means for reciprocatingly operating the plungers.

12. In a paper box machine, in combination, a standard having a peripheral cam thereon, and a frame revolubly mounted on said standard comprising a series of regularly spaced box molds therearound, an inner wall of each being movable, provided with a stem projecting inwardly, toward the standard, and a member slidably supported with which said stem is connected and which coacts with the cam on the standard, a spring for each movable inner wall, operative to force the latter outwardly, reciprocatory plungers mounted on and bodily revolubly movable with the frame, relatively to the respective box molds, means for intermittently revolubly moving the box mold frame, and means for reciprocatingly operating the plungers.

13. In combination, a revoluble frame having a plurality of circularly arranged box molds and plungers coacting with the box molds having radially arranged operating levers therefor, pair of oppositely arranged upwardly inclined cam bars, means on which said cam bars are pivotally mounted, and means for supporting the free ends of said cam bars in their normal positions.

14. In a machine of the character described, in combination, a revoluble frame having a plurality of circularly arranged box molds and vertical plunger carrying bars coacting with the molds, radially arranged plunger operating levers pivotally supported above the frame at their inner ends, having connections with the plunger bars at intermediate portions, thereof, and having their extremities projecting outwardly beyond such bars, a circular frame supported independently of the revoluble box mold frame provided with cams at different positions thereon relatively to which the extremities of said levers are successively brought to impingements.

15. In a machine of the character described, in combination, a revoluble frame having a plurality of circularly arranged box-molds and vertical plunger carrying bars coacting with the molds, radially arranged plunger-operating levers pivotally supported above the frame at their inner ends, having connections with the plunger bars at intermediate portions thereof, and having their extremities projecting outwardly beyond such bars, a circular frame supported independently of the revoluble box-mold-frame provided with cams at different positions thereon relatively to which the extremities of said levers are successively brought to impingements, which cams are comprised in bars, each pivotally mounted near an end thereof, and tiltable relatively to, the circular frame, for the actions described.

16. In a machine of the character described, in combination, a revoluble frame having a plurality of circularly arranged box molds and vertical plunger carrying bars coacting with the molds, radially arranged plunger operating levers pivotally supported above the frame at their inner ends, having connections with the plunger bars at intermediate portions thereof, and having their extremities projecting outwardly beyond such bars, a frame supported independently of the revoluble box mold frame provided with upwardly inclined cam bars at different positions thereon which are each pivotally mounted, near an end thereof, on and tiltable relatively to the independent frame, and said frame having cam forming flanges the ends of which extend over the short arms of the pivoted cam bars and which have down grade inclinations beyond such cam bars.

17. In combination, a table like frame having an aperture centrally therein, a box mold frame located and revoluble in such mold frame located and having plungers and central aperture and having plunger operating levers, radially arranged plunger operating levers, portions of which project outwardly beyond their connections with the plungers, a support mounted on the table like frame above the box mold frame having upwardly inclined cam bars pivotally mounted near the end of each bar on said support, and a supporting stop below and a limiting stop above each cam bar, which stops are mounted on said support.

18. In a machine of the character described, means for forwardly feeding and positioning blanks, a carriage having gummers depending therefrom, a trackway arranged at right angles to the line of blank feed, means, located adjacent the outer end of the trackway for supplying an adhesive to the gummers, means for transversely reciprocating the gummer carriage, means for permitting a descending movement of the latter when in its innermost position, and means for imparting a downward pressure to the descended carriage consisting of a pivoted lever having a pressure member, under which the carriage is traversed and lowered, a revoluble cam, a pivoted cam lever coacting therewith, a link connecting the cam lever and the pressure lever, and a spring connected to the last recited connected parts.

Signed by us at Lowell, Mass., in presence of two subscribing witnesses.

CHARLES T. UPTON.
GEORGE S. GILMAN.

Witnesses:
 WARREN H. SIMMONS,
 FRANCIS McNAMEE.